United States Patent [19]

Cox et al.

[11] 4,127,028
[45] Nov. 28, 1978

[54] CORIOLIS MASS FLOW RATE METERING MEANS

[75] Inventors: Bruce M. Cox; Floyd A. Gonzalez, both of Duncan, Okla.

[73] Assignee: Halliburton Company, Duncan, Okla.

[21] Appl. No.: 804,478

[22] Filed: Jun. 7, 1977

[51] Int. Cl.² .............................................. G01F 1/84
[52] U.S. Cl. .............................. 73/194 B; 73/194 M; 73/32 A
[58] Field of Search ............... 73/32 A, 194 B, 194 C, 73/194 M

[56] References Cited

U.S. PATENT DOCUMENTS

| | | | |
|---|---|---|---|
| 3,276,257 | 10/1966 | Roth | 73/194 M |
| 3,456,491 | 7/1969 | Brockhaus | 73/32 A |
| 3,485,098 | 12/1969 | Sipin | 73/194 B |

*Primary Examiner*—James J. Gill

*Attorney, Agent, or Firm*—Floyd A. Gonzalez; John H. Tregoning

[57] ABSTRACT

A flow meter for measuring mass flow is disclosed having two vibrating U-shaped tubes, a means for vibrating the tubes, and sensors for detecting the coriolis force couple which results from the vibration and the flow of the material to be measured through the meter. The U-shaped tubes include spaced apart inlet and outlet sections connected to a fixed member at one end, and having the sensors at the other end thereof. The fixed ends are more closely spaced together than are the other ends having the sensors for increasing the moment arms acted on by the coriolis force couple for more easily detecting twist of said U-shaped tubes. The U-shaped tubes also are arranged to have the same natural of frequency for longitudinal oscillations and for torsional oscillations.

12 Claims, 11 Drawing Figures

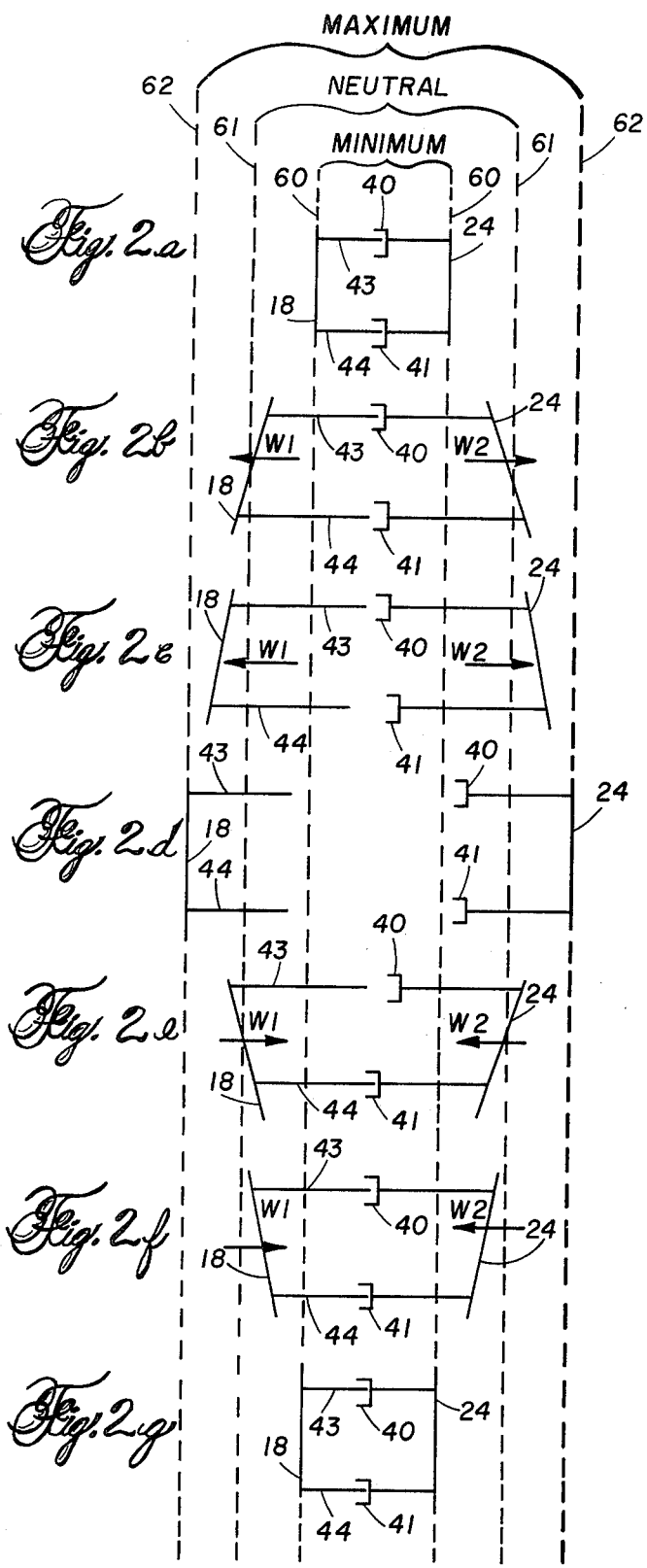

CORIOLIS MASS FLOW RATE METERING MEANS

BACKGROUND OF THE INVENTION

This invention relates to a means for measuring mass flow of fluent material such as liquids, gases and fluent solid material wherein the coriolis force is utilized as an indication of the mass flow. The flow meter includes U-shaped tubes which are vibrated while a fluent material to be measured flows through the tubes. The tubes are so constructed that the moment arm acted on by the coriolis force couple is increased so that the force couple may be more easily measured. The preferred embodiment of the flow meter includes two U-shaped flow tubes which are arranged to form a tuning fork. This arrangement allows for the tubes to be vibrated using much less force than is necessary with a single U-tube.

The patent to Poole, et al., U.S. Pat. No. 2,635,462 discloses a densometer wherein two hollow vibrating elements are arranged to form two tines of a tuning fork. Each element is made up of a set of two concentric flow tubes for forming a flow path through the densometer. The tines are vibrated and the natural frequency of the vibrations varies with the density of the material in the densometer. A feedback system for the vibrator is disclosed for measuring the density of the material flowing through the meter.

A densometer using U-shaped flow tubes for the tines of a tuning fork has also been constructed wherein the fluent material flows through an inlet port in a fixed member, into a first U-shaped loop, through the loop and back to the fixed member, through an innerconnecting flow means to a second U-shaped tube, through the second U-shaped tube back to the fixed member, and finally out through an outlet port in the fixed member. In this densometer, vibrations in the first U-tube set up sympathetic vibrations in the second U-tube to reduce the power necessary to cause the required oscillations in the tuning fork arrangement.

U.S. Pat. No. 3,355,944 to Sippin shows a U-shaped tube which may be vibrated. The coriolis force couple caused by the vibrations create a torque which is measured to determine the mass flow of the material flowing through the tube.

A coriolis type flow meter has been built which utilizes a U-shaped tube with its two open ends in a fixed member for one-half of the tuning fork. The other half of the tuning fork is formed by a metal bar with one end in the fixed member, and having the other end free to oscillate. The bar and the U-shaped tube are vibrated by means of an electromagnet fixed to the free end of the solid bar and magnetically pushing and pulling the intermediate or U portion of the tube.

The flow meter of the present invention uses a pair of spaced apart U-shaped tubes with their ends in a fixed member forming a tuning fork arrangement. In the preferred embodiment the U portion of the first tube includes a vibrating means for oscillating the U portion of the second tube. The frequency of the oscillations are adjusted until the U-shaped tubes vibrate a fixed displacement when a known material is flowing through the meter. The power needed to vibrate the U-shaped tubes a known displacement at a fixed frequency determines the density of an unknown fluent material flowing through the U-shaped tubes.

These flow tubes are also arranged such that the coriolis force couples cause opposite torques in each U-shaped tube. The inlets to the U-shaped tubes are spaced close together and the U-shaped tubes contain bent portions such that the moment arms acted on by the coriolis force couples is increased, thus making the meter's sensitivity to these coriolis forces much greater. Several embodiments of the vibrating tubes are also disclosed.

The drawings include the following:

FIGS. 2a-2g show views of the sensors as attached to the intermediate pieces of the flow tube as the two tubes oscillate;

Figure 4:
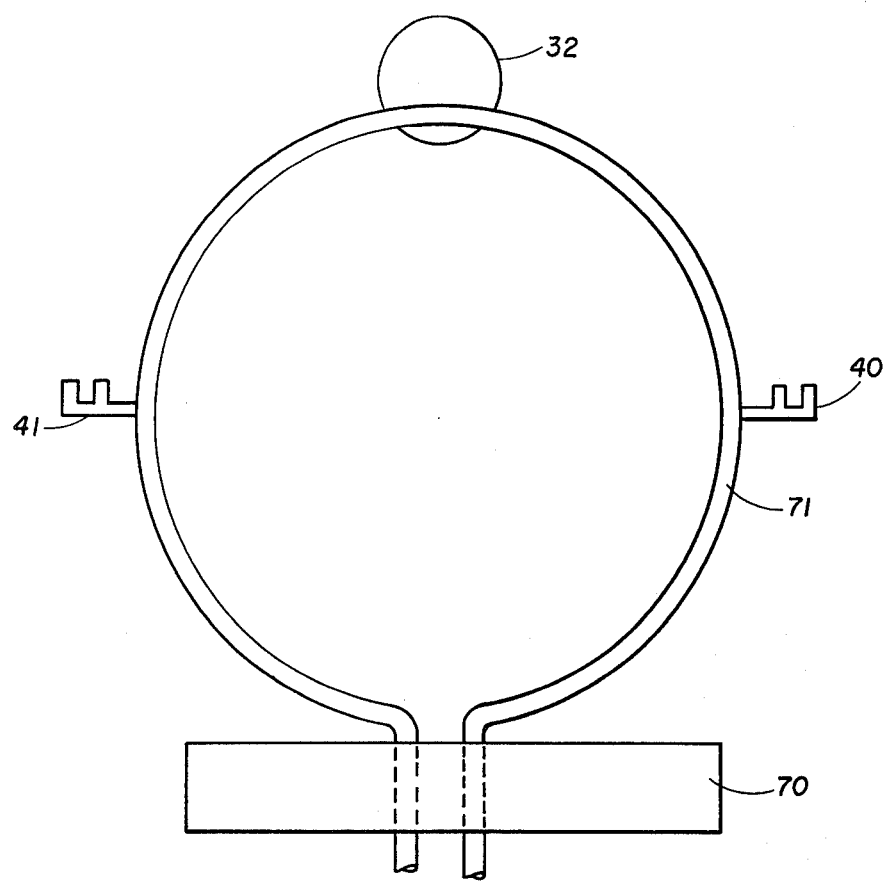

FIG. 3 lists the state of sensors such as those shown in FIGS. 2a-2g;

FIG. 4 shows a second embodiment of the flow tubes; and

Figure 5:
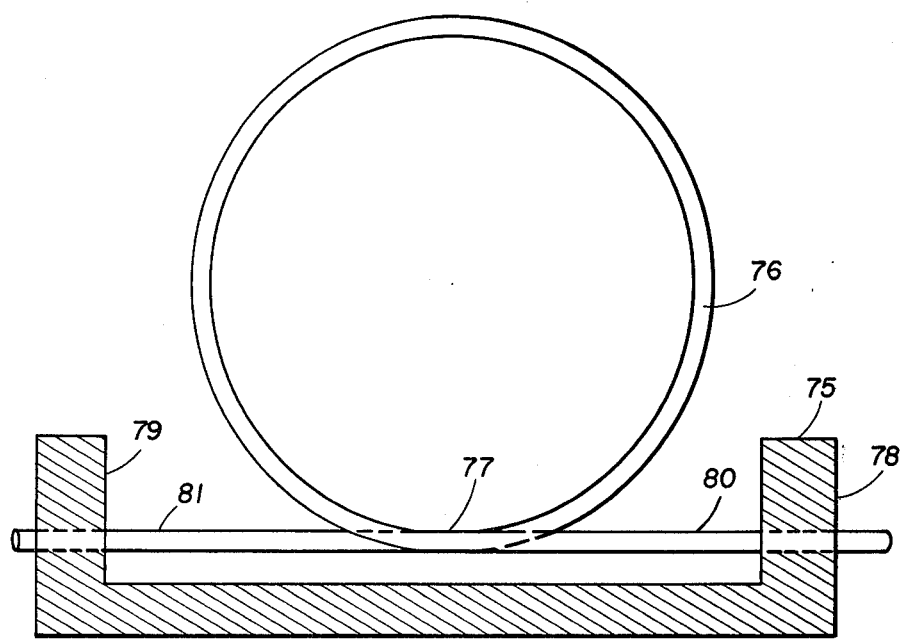

FIG. 5 shows another embodiment of the flow tube.

If a straight tube is pivoted at one end and rotated around the pivot, and a material flows through the tube, a coriolis force will be exerted on the tube which is equal to two times the density of the material flowing through the tube times the cross product of the volume of flow vector and the angular velocity vector. If the fingers of the right hand are curled in the direction of the rotation, the thumb will point in the direction of the angular velocity vector. As is known, the coriolis acceleration is at right angles to the angular velocity vector and the direction of flow.

If a U-shaped tube is pivoted at the two open ends of the tube and rotated about the pivot, and a material flows through the tube, a coriolis force couple acts on the inlet and the outlet sections of the tube. This couple is caused by the opposite direction of flow of the material in these inlet and outlet sections. This force couple twists or torques the U-shaped tube about an axis which is in the plane of the tube, and which is parallel to the inlet and outlet sections and equidistant between them.

If the U-shaped tube is vibrated back and forth instead of rotated, the force couples will oscillate back and forth as the angular velocity reverses. The measurement of their coriolis force couple in a mass flow meter using a U-shaped tube is discussed in the aforementioned Sippin patent, U.S. Pat. No. 3,355,944.

If two U-shaped tubes are arranged in the shape of a tuning fork, much less power is needed to oscillate the two tubes at their natural frequency than would be required to oscillate one U-shaped tube alone.

When the tubes vibrate as a tuning fork, they will alternately come close together to a minimum spacing, and then separate to a maximum spacing. It can thus be seen that the angular velocity vector for one tube will always be opposite from the angular velocity vector for the other tube. If the flow through the two tubes is the same, that is if the flow in the inlet sections are both in a first direction, and the flow in the outlet sections are both in an opposite direction, then the tubes will be subject to opposing torques because of the opposite angular velocity vectors.

Thus, with the flows indicated, the two tubes alternately twist from the opposite torques so that, for instance, the two inlet sections alternately are twisted toward each other, and then are twisted away from each other during the vibrations described.

PREFERRED EMBODIMENTS

Figure 1:
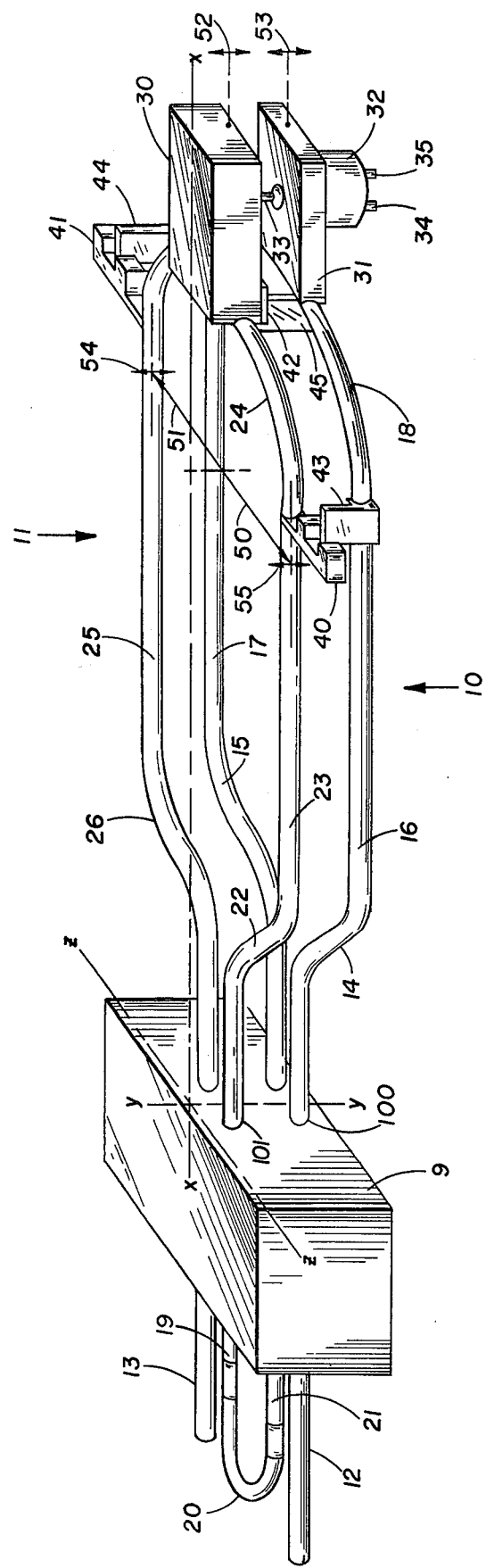
FIG. 1 is a three dimensional diagram of the flow meter showing two U-shaped tubes of the invention, electromagnetic vibrator means, and sensor means.

The flow meter of the invention is shown in a three dimensional view in FIG. 1. FIG. 1 shows the flow meter having an inlet 12 and outlet 13, a fixed member 9 and two vibrating loops 10 and 11. At the U-shaped portion of the vibrating loops 10 and 11 are shown blocks 30 and 31. A vibrating means such as a solenoid 32 is attached to block 31 and a connecting means 33 such as a cable or a solid rod is attached to the plunger of a solenoid 32 and passes through block 31 and is attached to block 30. Also attached to the vibrating loops 10 and 11 are sensors 40, 41 and 42 mounted on one vibrating loop and interrupting blades 43, 44 and 45 mounted on the other vibrating loop as shown.

The mass of block 30 is equal to the sum of the masses of block 31 and solenoid 32 and is placed such that the natural frequency of loops 10 and 11 are the same.

The outlet 21 of vibrating loop 10 is connected to the inlet of vibrating loop 11 by an innerconnecting means 20 such as a flexible hose as is shown. Thus it can be seen that fluid material flowing into inlet 12 flows into vibrating loop 10, around vibrating loop 10 to the outlet 21 of this loop, through the innerconnecting means 20 to the inlet 19 of the second vibrating loop 11. The material to be measured then flows through the second vibrating loop 11 and then out the outlet 13 of the flow meter. The flow in inlet sections 16 and 23, and the flow in outlet sections 17 and 25, are in the same direction.

Vibrating loop 10 includes an inlet section 16 and an outlet section 17 spaced apart from one another and connected by an intermediate section 18. The inlet section 16 and outlet section 17 include bent portions 14 and 15 as shown. Likewise, vibrating loop 11 includes inlet section 23, outlet section 25 and intermediate section 24. Also, the inlet section 23 and outlet section 25 contain the bent portions 22 and 26 as shown.

Solenoid 32 is activated by applying electrical pulses to terminals 34 and 35. Applying electrical pulses to terminals 34 and 35 activate solenoid 32 such that vibrating loops 10 and 11 are pulled together by connecting means 33. At the end of the electrical pulse the spring action of the two loops 10 and 11 cause the loops to separate. Thus, the frequency of the vibrations can be controlled by controlling the frequency of the electrical pulses applied to terminals 34 and 35.

As is known in the art, other means may be used to impart vibrations to the vibrating loops. For instance, electromagnets could be used which would cause the loops 10 and 11 to alternately attract and repulse one another. Also electric motors or other types of oscillating means may be used to either pull in one direction only or to alternately pull and push the loops to cause the desired vibrations.

As can be seen, these loops vibrate around a Z axis as is shown by the arrows 52 and 53. These vibrations, and the fluid material flowing through the tubes, cause coriolis force couples to torque the loops 10 and 11 around the X axis. The purpose of the bent sections 22, 26, 14 and 15 is to increase the moment arms on which the coriolis force couples act to torque loops 10 and 11. These moment arms are demonstrated by arrows 50 and 51 and cause oscillations about the X axis as is shown by arrows 54 and 55. It will be understood that similar moment arms and vibrations are set up in vibrating loop 10.

It can been seen that loops 10 and 11 act as tines of a tuning fork. The frequency of the electrical pulses applied to terminals 34 and 35 of the solenoid 32 is the natural frequency of the tuning fork formed by loops 10 and 11 when the loops are filled with a known substance such as water. In the preferred embodiment, the natural frequency of the torsional oscillations as illustrated by arrows 54 and 55 is equal to the natural frequency of the longitudinal oscillations of the tuning fork illustrated by arrows 52 and 53. It can thus be seen that by applying forces to the blocks 30 and 31 by means of the solenoid 32 oscillations may be set up in the tuning fork formed by loops 10 and 11. These oscillations cause coriolis force couples which cause a torsional oscillation illustrated by arrows 54 and 55. This design allows a minimum of power to be used to set up the longitudinal oscillations desired and cause a maximum of deflection illustrated by arrows 54 and 55 by the coriolis force couples.

The sensor shown by sensor element 42 and blade 45 is used to measure the oscillations of loops 10 and 11.

It is known that the natural frequency of a vibrating tube will vary with the density of the material flowing through the tube. If a set frequency is selected, such as the natural frequency with loops 10 and 11 filled with water, the density of an unknown material to be measured in loops 10 and 11 will attempt to change the natural frequency of the vibrations from the set frequency selected. Thus it can be seen that if loops 10 and 11 are longitudinally oscillated at a given frequency and a constant amplitude with solenoid 32, then the power requirements of solenoid 32 will vary with the density of the material flowing in the loops 10 and 11.

Sensor 42 and blade 45 are arranged to sense when the amplitude of the oscillations reaches a certain value. An automatic gain control or feedback loop including sensor 42, such as is known, may be used to control and measure the power of the electrical impulses supplied to terminals 34 and 35 for holding the longitudinal amplitude of the vibrational oscillations at a desired level and the frequency of the oscillations constant.

The torsional oscillations of the loops 10 and 11 about the X axis as shown in FIG. 1 may be determined by sensors 40 and 41 as illustrated in FIGS. 2a-2g.

Sensors 40 and 41 are in one preferred embodiment, a photo interrupter type module forming a saddle. One side of the saddle contains a light source and the other side of the saddle contains a photo reactive switch such as a photo transistor. The interrupter module is turned off by placing a leaf between the photo reactive switch and the light source in this saddle. Such an interrupter module is the GE H13A1.

Other sensors, however, could be used such as is known in the art. These sensors could include strain gauges at the input and output ends of the loops 10 and 11 or magnetic velocity sensors.

As is known in the art, there will be a phase shift between the outputs of the two sensors, which phase shift is proportional to the coriolis force couple turning the individual sensors on and off.

The sensors of the preferred embodiment are positioned such that they are barely turned off when the sensors are at the neutral or at rest positions indicated by the lines labeled 61 in FIGS. 2a-2g. Lines 60 of FIGS. 2a-2g indicate the minimum spacing which occurs when the loops 10 and 11 are pulled to their closest point in their vibrations. Lines 62 indicate the maximum position that the sensors will reach when the loops 10 and 11 approach their maximum point of separation during their vibrations. As shown in FIGS. 2a, 2d and 2g the intermediate sections 18 and 24 of the loops will not experience a force couple at the maximum and minimum points because at these points the angular velocity of the vibrations will be zero.

FIG. 2a shows that sensors 40 and 41 are turned off as blades 43 and 44 interrupt the beams of the sensors. At FIG. 2b, the intermediate sections 18 and 24 are moving outwardly in the directions indicated by the arrows labeled w1 and w2. Bacause of the coriolis force couples which cause opposite torques, it can be seen that the leading edges of intermediate sections 18 and 24 have reached lines 61. This causes the blade 44 to withdraw from sensor 41 a sufficient distance to turn on sensor 41. The opposite torques have, however, caused blade 43 to hold sensor 40 in the off condition. FIG. 2c shows that the trailing edges of intermediate sections 18 and 24 have just passed lines 61 causing sensor 40 to turn on. FIG. 2d shows the intermediate sections 18 and 24 reaching their maximum distance apart with sensors 40 and 41 turned on.

FIG. 2e shows intermediate sections 18 and 24 moving inwardly as indicated by the arrows marked w1 and w2. The leading edges of intermediate sections 18 and 24 have passed lines 61 slightly to thereby turn off sensor 41. Trailing edges of intermediate sections 18 and 24 have not yet reached lines 61 thereby holding sensor 40 in the on position. FIG. 2f shows that intermediate sections 18 and 24 have moved inwardly sufficiently that sensor 40 is turned to the off position. FIG. 2g again represents the condition where the vibrating loops 10 and 11 have reached their point of closest spacing with sensors 40 and 41 in the off position.

FIG. 3 is a chart which tabulates the condition of sensors 40 and 41 as shown in FIGS. 2a-2g as indicated. It can be seen that there is a phase shift between sensors 40 and 41. This phase shift can be detected and will increase with respect to time as the mass flow through loops 10 and 11 is increased.

It has been found that larger longitudinal vibrations, while not increasing the coriolis force couples being measured, does increase the length of time that these coriolis force couples are present. This increases the RMS value of the alternating torques such that they may be more easily measured. This is important in the use of larger flow tubes for large size flow meters.

Shown in FIG. 4 is a second preferred embodiment of the vibrating loops. Shown is a vibrating loop 71 held in a fixed member 70 wherein loop 71 is in the form of a circle. Shown attached to the vibrating loop 71 are sensors 40 and 41 which are the same as the sensors with the same numbers shown in FIG. 1. A vibrating means, such as solenoid 32 is shown at the free end of the circular loop 71.

FIG. 5 shows loop 76 which is another preferred embodiment of the vibrating loop in the shape of a circle. Fixed member 75 includes portions 78 and 79 through which loop extensions 80 and 81 pass. It will be noticed that loop 76 must bypass itself as shown at 77. The embodiment in FIG. 5 may also contain sensors such as those shown in FIGS. 1 and 4 and include vibrating means also shown in FIGS. 1 and 4. It will be understood that FIGS. 4 and 5 only show one loop of a flow meter which preferably include two loops of the tuning fork design.

It will be understood that with the constant longitudinal vibrations of the loops 10 and 11 that the inlet section 16 and 23 and the outlet section 17 and 25 might fail due to fatigue where these sections pass through the fixed member 9 in areas 100 and 101 as shown in FIG. 1. Flow loops 10 and 11 may be made from materials which are less subject to fatigue failure to give the flow meter a longer life.

Bellows or other pivot means might also be provided on the ends of flow loops 10 and 11 at areas 100 and 101. However, such means would rely on oscillations provided by an oscillating means because, in this case, loops 10 and 11 would no longer act as a tuning fork. Likewise, rotating bushings might be provided in fixed member extensions 78 and 79 where loop extensions 80 and 81 pass through to reduce or eliminate torsional stress on extensions 80 and 81. Also, if such bushings were provided, loop 76 would not oscillate at a natural frequency in the longitudinal direction.

Other embodiments which work equally well and are equivalent to the embodiments shown may be imagined by one skilled in the art. The attached claims are intended to cover such equivalent embodiments of the invention which may occur to one skilled in the art.

What is claimed is:

1. In a meter of the coriolis force type including a tubular loop for having a flow therethrough to be measured, means for vibrating the bight end of the loop perpendicular to the plane of the loop, means fixing the input and output ends of the loop to prevent translation of said fixed ends with respect to said vibrating means for providing an axis of rotation of the vibrations of the loop through said fixed ends, and means for measuring the coriolis force couple resulting from the angular velocity of the vibrations and the velocity of the flow through the loop, the improvement comprising an outwardly directed bend in the loop and a corresponding inwardly directed bend in the loop, both of said bends arranged to maintain said tubular loop in a plane, said bends being further arranged for providing a portion of the loop wherein the torsional moment arms with respect to said fixed ends to be acted on by said coriolis force couple is increased.

2. The meter of claim 1 wherein said loop is arranged for its natural torsional vibrational frequency to be nearly equal to its natural longitudinal vibrational frequency.

3. The meter of claim 1 further comprising a second loop spaced from said first loop, said second loop having the same natural frequency of vibration as said first loop and arranged for forming a tuning fork with said first loop.

4. The meter of claim 3 further comprising sensors on said first and second loops for sensing a coriolis force couple causing twist in said loops.

5. The meter of claim 4 wherein each of said sensors include an electronic switch; which switch is in one state when said loops are at their at-rest position, and said switch is in its second state when said loops are moved to any position separating said switch from the other loop by a distance greater than the distance which exists when said loops are at their at-rest position.

6. A flow tube for a coriolis force flow meter of the type wherein the inlet and outlet ends of the flow tube are fixed and the bight end of the tube is cantilevered from said fixed ends, said flow tube comprising:
   spaced apart bent inlet and outlet sections having inlet and outlet ends respectively;
   an intermediate section extending between said inlet and outlet sections and having its ends connected thereto for allowing fluid flow through said inlet section to flow through said intermediate section and into said outlet section;

said inlet and outlet ends being spaced closer together than the ends of said intermediate section, and said inlet and outlet sections including bends for connecting the inlet and outlet sections to the ends of the intermediate section respectively for increasing the torsional moment arms with respect to said fixed ends acted on by a coriolis force couple existing when there is a fluid flow through said flow tube and the flow tube has an angular velocity about an axis through the inlet and outlet ends.

7. The flow tube of claim 6 wherein, when said inlet and outlet ends are fixed, the natural torsional vibrational frequency of said flow tube is nearly equal to the natural longitudinal vibrational frequency of said flow tube.

8. The flow tube of claim 6 further comprising two sensors, one on said inlet section and one on said outlet section, said sensors being positioned on said sections for having a greater distance of separation from each other than said inlet and outlet ends are separated from each other.

9. The flow tube of claim 6 wherein said bent inlet and outlet sections and said intermediate section form a circular flow path, and said inlet and outlet ends are fixed side-by-side in a fixed member in the same plane as the flow tube.

10. The flow tube of claim 6 wherein said bent inlet and outlet sections and said intermediate section form a circular flow path, and said inlet and outlet ends pass one another in a plane which is at right angles to the plane of the flow tube; said inlet and outlet ends being connected to inlet and outlet extensions which are in the same plane and at an extreme end of said circular flow path.

11. The flow tube of claim 10 further comprising means for oscillating said flow tube perpendicular to the plane of said flow tube around an axis equidistant from and parallel to said inlet and outlet extensions, said axis being in the plane of said inlet and outlet extensions; said oscillating means having a frequency of oscillation nearly the same as the frequency of the natural torsional oscillations of said flow tube when said flow tube is filled with a given material.

12. In a meter of the coriolis force type including a tubular loop for having a flow therethrough to be measured, means for vibrating one end of the loop perpendicular to the plane of the loop, and means for measuring the coriolis force couple resulting from the angular velocity of the vibrations and the velocity of the flow through the loop, the improvement comprising arranging the flow loop for having its natural torsional vibrational frequency nearly equal to its natural longitudinal vibrational frequency.

* * * * *

Dedication 4,127,028.—*Bruce M. Cox* and *Floyd A. Gonzalez*, Duncan, Okla. CORIOLIS MASS FLOW RATE METERING MEANS. Patent dated Nov. 28, 1978. Dedication filed Oct. 15, 1985, by the assignee, *Micro Motion, Inc.*

Hereby dedicates to the Public the remaining term of said patent.
[*Official Gazette June 17, 1986.*]